(12) United States Patent
Chen et al.

(10) Patent No.: US 8,253,878 B2
(45) Date of Patent: Aug. 28, 2012

(54) ADJUSTABLE SUPPORT APPARATUS FOR AN LCD MONITOR

(75) Inventors: Yun-Lung Chen, Taipei Hsien (TW); Bang-Chun Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 618 days.

(21) Appl. No.: 12/489,826

(22) Filed: Jun. 23, 2009

(65) Prior Publication Data

US 2010/0118228 A1 May 13, 2010

(30) Foreign Application Priority Data

Nov. 10, 2008 (CN) .......................... 2008 2 0302714

(51) Int. Cl.
*G02F 1/1333* (2006.01)

(52) U.S. Cl. ....... 349/58; 349/60; 361/679.22; 248/920; 248/919

(58) Field of Classification Search .................... 349/58, 349/60; 248/919–920; 361/679.22
See application file for complete search history.

(56) References Cited

U.S. PATENT DOCUMENTS

2005/0263660 A1* 12/2005 Hsiung ...................... 248/291.1
* cited by examiner

*Primary Examiner* — Nathanael R Briggs
(74) *Attorney, Agent, or Firm* — Altis Law Group, Inc.

(57) ABSTRACT

An adjustable support apparatus for an LCD monitor is provided. The support apparatus includes a receiving bracket, a cover secured to the receiving bracket, and a sliding member received between the receiving bracket and the cover. The sliding member is capable of sliding relative to the receiving bracket and the cover. A securing member is slidably attached to the cover. An elastic positioning member is secured to the cover. A plurality of positioning grooves is defined in the sliding member, and the securing member biases the positioning members to engage in one of the positioning grooves.

20 Claims, 7 Drawing Sheets

ADJUSTABLE SUPPORT APPARATUS FOR AN LCD MONITOR

BACKGROUND

1. Technical Field

The present disclosure relates to LCD monitors, and particularly, to an LCD monitor with an adjustable support apparatus.

2. Description of Related Art

LCD monitors as computer peripherals are welcome because of their light-weight and excellent display qualities. Generally, an LCD monitor includes a support apparatus configured for supporting the LCD monitor on a worktable. Conventionally, the support apparatus is fixed to the LCD monitor. Angles between the LCD monitor and the worktable cannot be adjusted. When users want to adjust the LCD monitor to different angles, an additional rotating mechanism is needed, thus cost is added to the LCD monitor.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
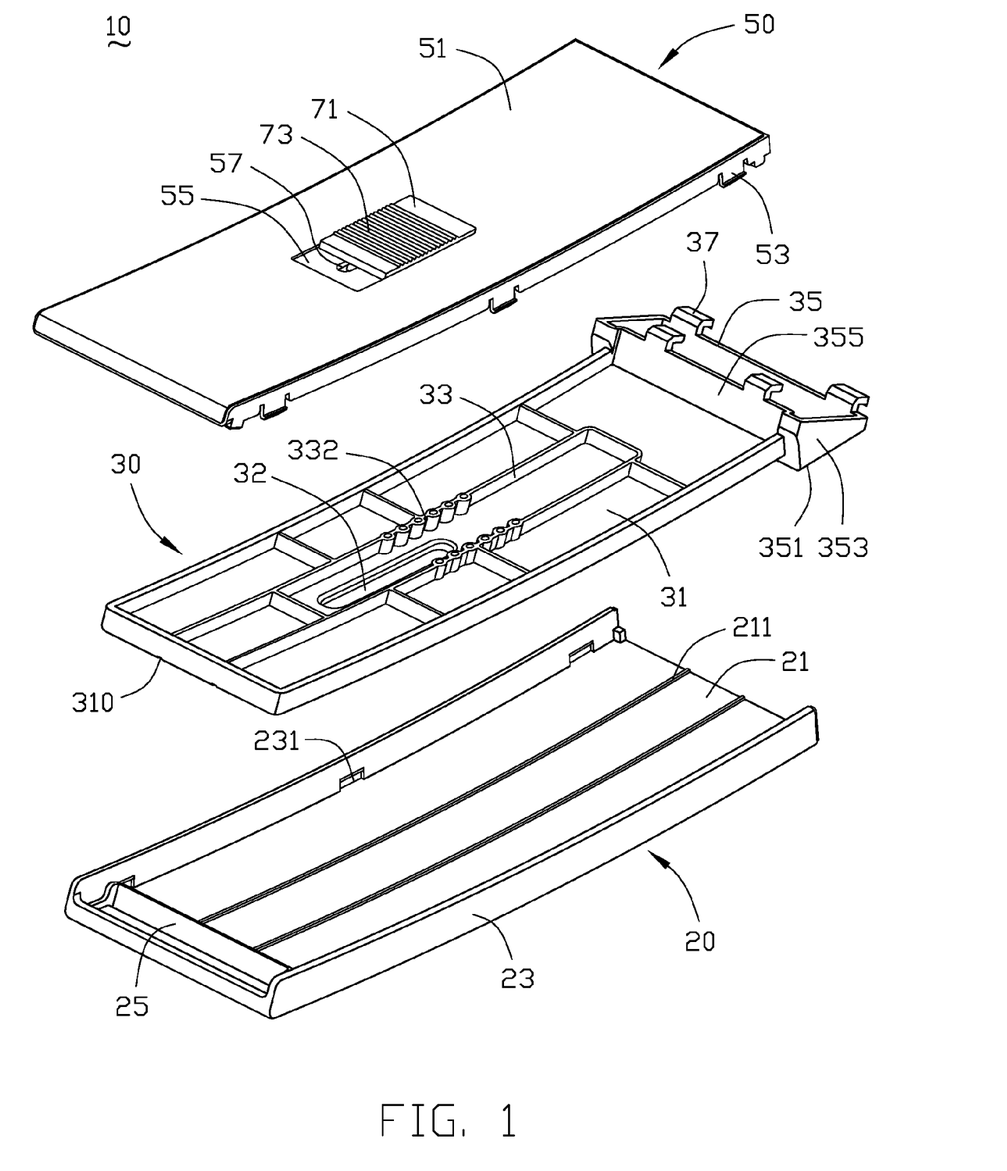
FIG. 1 is an exploded, isometric view of one embodiment of an adjustable support apparatus for an LCD.
Figure 6:
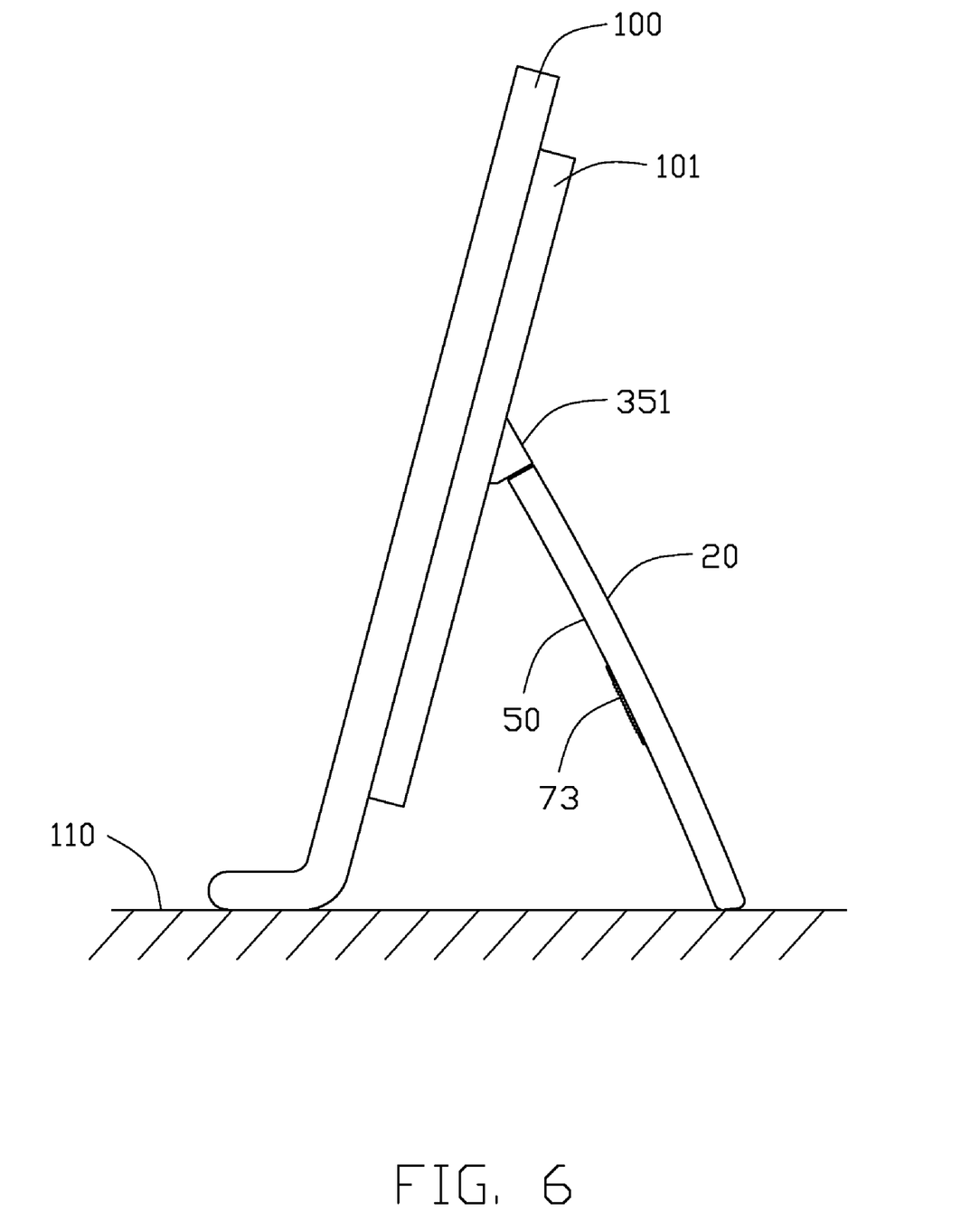
FIG. 6 shows the support apparatus mounted to an LCD monitor and the LCD monitor is supported on a worktable.
Figure 7:
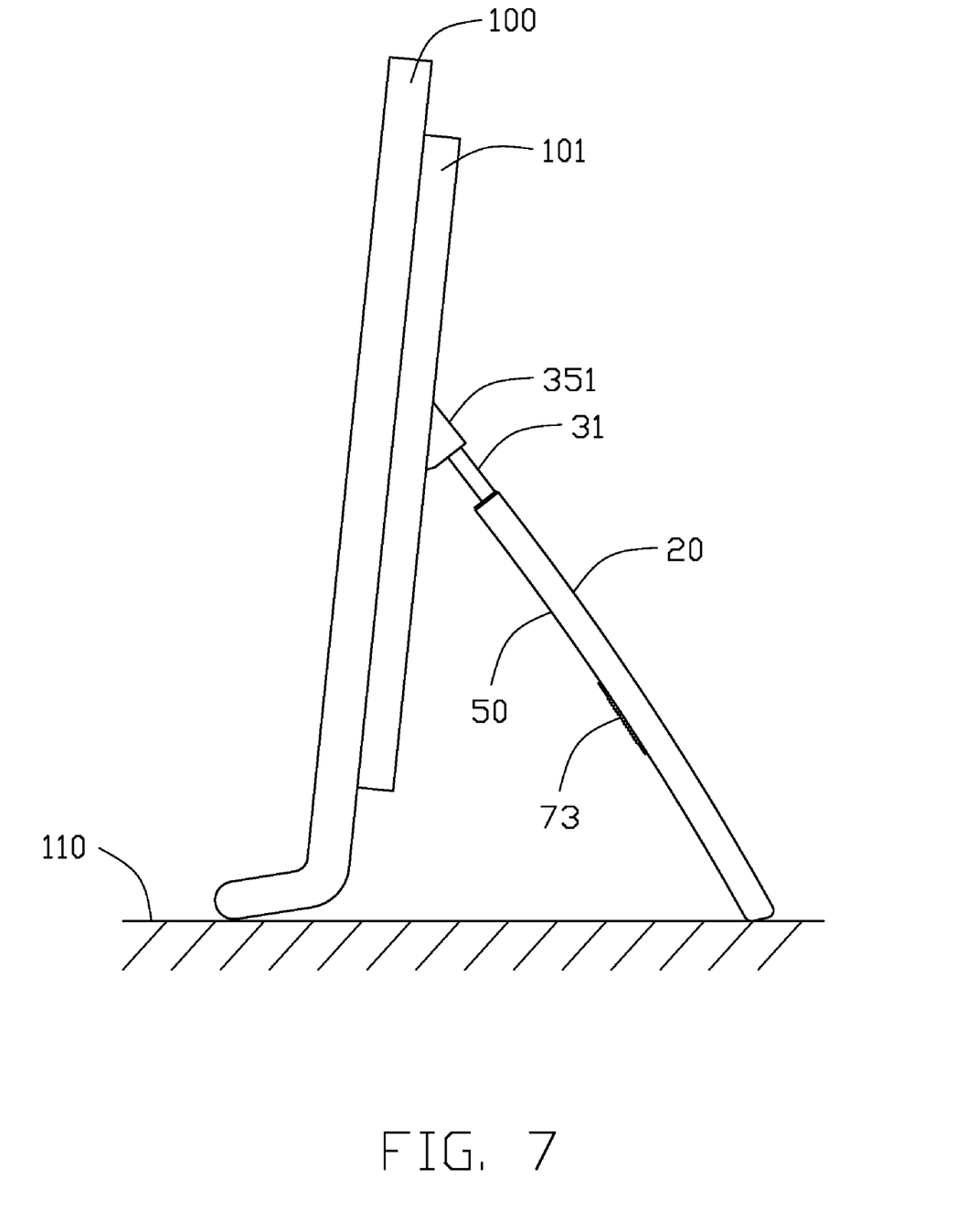
FIG. 7 is similar to FIG. 6, but showing the LCD monitor arranged at a different angle.

Referring to FIG. 1, one embodiment of a support apparatus 10 for an LCD monitor 100 (as shown in FIGS. 6-7) includes a receiving bracket 20, a cover 50, and a sliding member 30 slidably accommodated between the receiving bracket 20 and the cover 50. An elastic positioning member 60 is secured to the cover 50. An actuating member 70 and a securing member 80 are slidably attached to the cover 50.

The receiving bracket 20 includes a rectangular panel 21 and two sidewalls 23 perpendicularly extend from two side edges of the panel 21. Two sliding ridges 211 protrude from the panel 21 along a longitudinal direction. A plurality of securing slots 231 is defined in the two sidewalls 23. A transverse blocking bar 25 is connected between the two sidewalls 231 and generally perpendicular to the sliding ridges 211.

Figure 2:
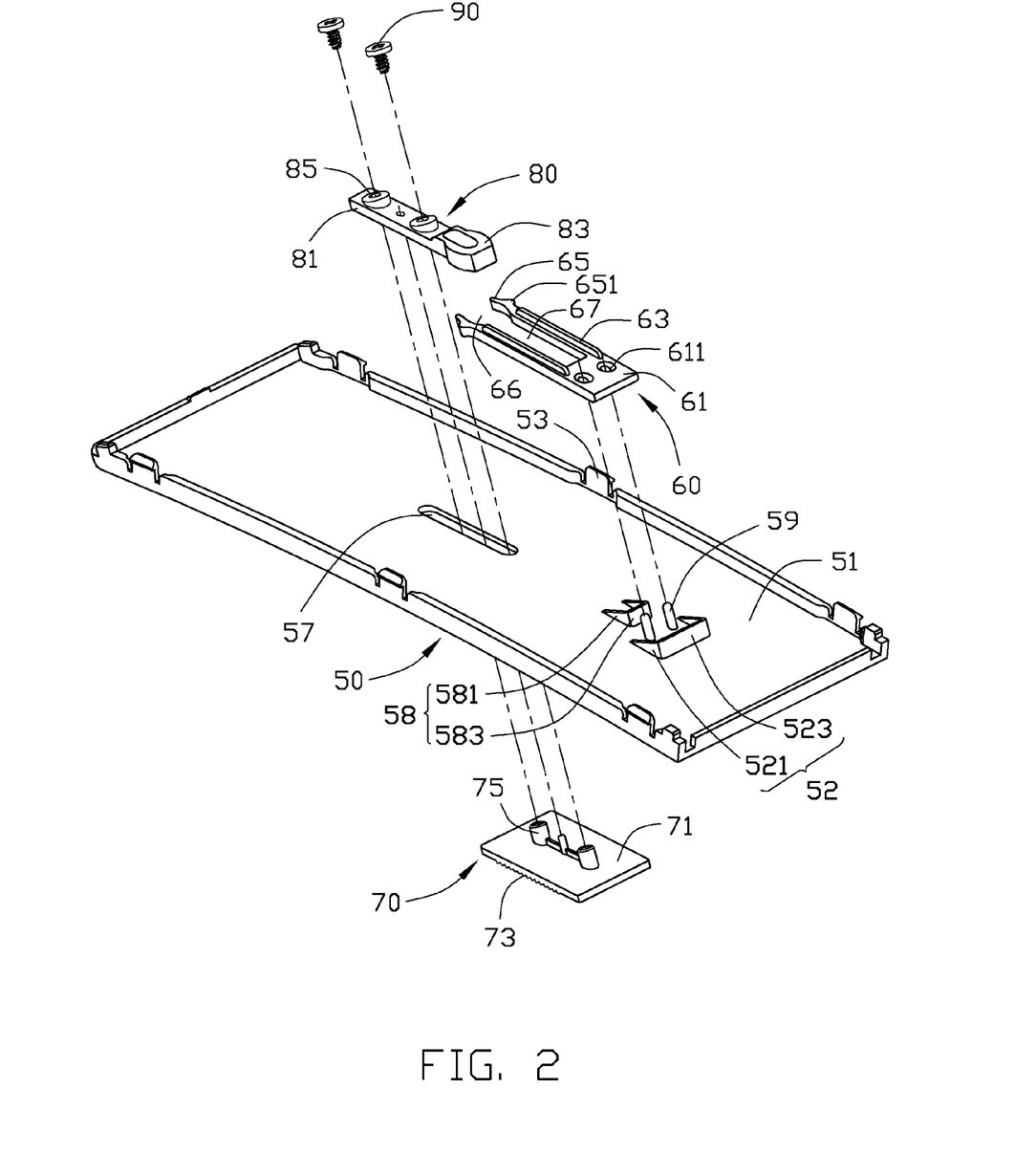
FIG. 2 is an exploded, isometric view of the cover in FIG. 1, but viewed from another aspect.

Referring to FIG. 2, the cover 50 includes a base plate 51. A plurality of securing hooks 53 protrudes from the base plate 51, and extend into the receiving bracket 20 to engage with the securing slots 231. A notch portion 55 is defined in an outer surface of the base plate 51. A longitudinal slot 57 is defined in the notch portion 55. Two securing posts 59 extend from an inner surface of the base plate 51. A first limiting portion 52 and a second limiting portion 58 extend from the inner surface of the base plate 51. The first limiting portion 52 includes two first resisting pieces 521 and a first limiting piece 523. The two first resisting pieces 521 extends from two opposite sides of the first limiting piece 523. The second limiting portion 58 includes two second resisting pieces 581 and a second limiting piece 583. The two second resisting pieces 581 extend from two opposite sides of the second limiting piece 583. The first limiting piece 523 is opposite to the second limiting piece 583. The two first resisting pieces 521 are opposite to each other. The two securing posts 59 are located between the first limiting piece 523 and the second limiting piece 583.

The elastic positioning member 60 includes a base 61 and two parallel resilient arms 63 extending from two sides of the base 61. A limiting slot 67 is defined between the two resilient arms 63. An arc-shaped positioning hook 65 extends from an end of each resilient arm 63. Each positioning hook 65 has a laterally protruding positioning portion 651. An accommodating space 66 is defined between the two hooks 65. Two securing holes 611 are defined in the base 61 of the positioning member 60, for receiving the securing post 59 to extend therethrough securing the positioning member 60 to the cover 50. When the positioning member 60 is secured to the cover 50, the second limiting portion 58 is received in the limiting slot 67, and the base 61 is located between the first limiting piece 523 and the second limiting piece 583, and between the two first resisting pieces 521. The first limiting portion 52 and the second limiting portion 58 restrict the positioning member 60 from moving along a direction substantially parallel to the base plate 51.

The actuating member 70 includes a rectangular main body 71 configured to be received in the notch portion 55 in the cover 50. A length of the main body 71 is less than that of the notch portion 55 so that the main body 71 is capable of freely sliding in the notch portion 55. A grooved portion 73 is formed in an outer surface of the main body 71 for operating. Two securing post 75 protrude from the main body 71.

The securing member 80 includes a longitudinal base 81 and an expanded blocking portion 83 protruding from an end of the longitudinal base 81. The blocking portion 83 has an arc-shaped profile fitting the accommodating space 66 of the positioning member 60. Two securing holes 85 are defined in the longitudinal base 81.

Figure 3:
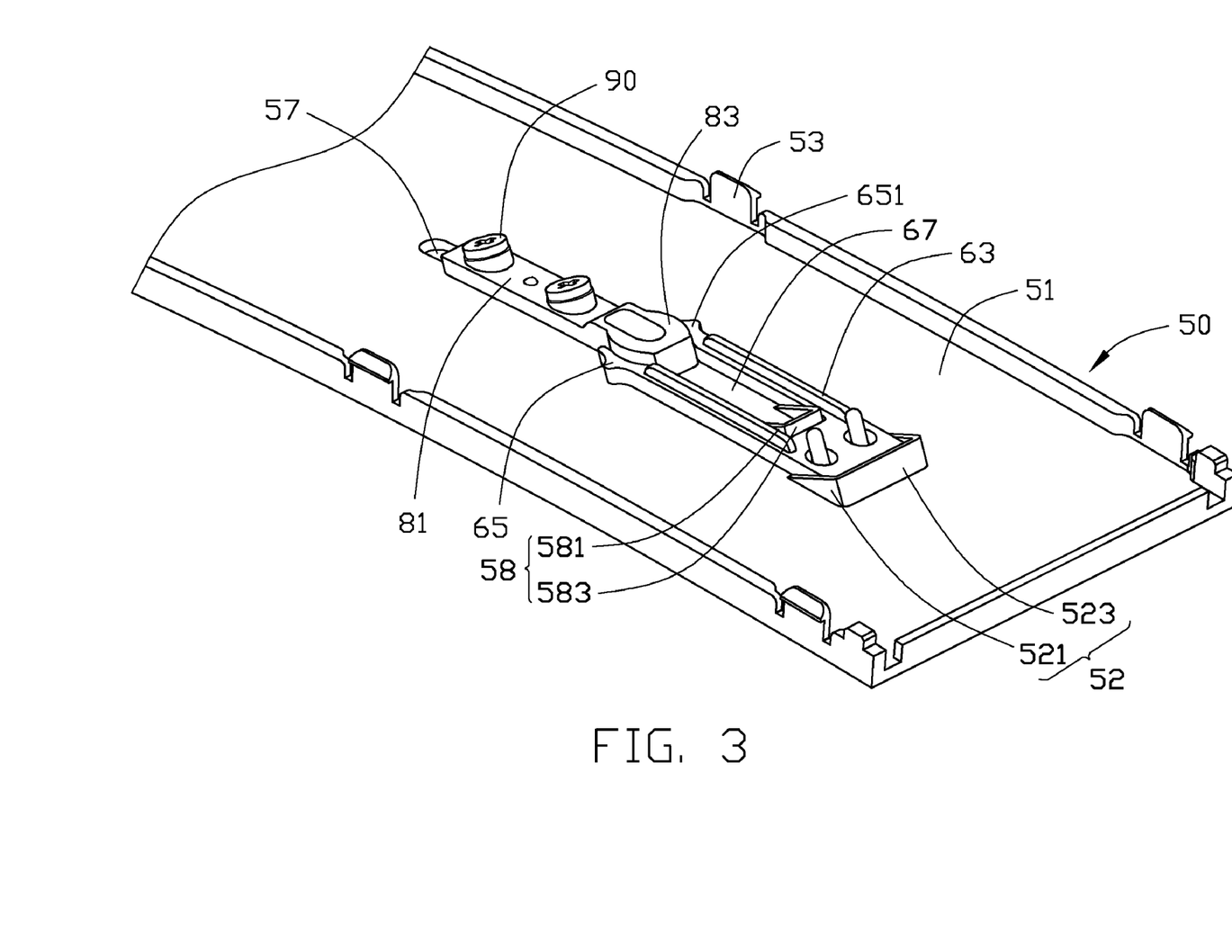
FIG. 3 is an assembled view of FIG. 2.

Referring to FIG. 3, in assembling the securing members 80 and the actuating members 60 to the cover 50, the securing posts 75 of the actuating member 70 extend through the slot 57 in the cover 50. Two fasteners 90 respectively extend through the securing holes 85 in the securing member 80 to engage with the securing posts 75. Thereby, the securing member 80 is secured to the actuating member 70. The actuating member 70 and the securing member 80 are capable of sliding along the cover 50 in length range of the slot 57.

The sliding member 30 includes a rectangular supporting base 31 and a connecting head 35 extend from one end of the supporting base 31. Two positioning ribs 33 extend from the supporting base 31. A plurality of grooves 332 is arranged in a middle portion of each positioning rib 33. A slot 32 corresponding to the slot 57 in the cover 50 is defined between the two positioning ribs 33, and configured to provide a sliding space for the fasteners 90 of the cover 50. Two guiding slots 310 are defined in a bottom surface of the supporting base 31, and configured for the sliding ridges 211 sliding therein. In an alternative embodiment, the guiding slots 310 may be defined in the receiving bracket 20, and the sliding ridges 211 may be formed on the sliding member 30.

The connecting head 35 is configured to be secured to the LCD monitor 100 (shown in FIGS. 6-7). The connecting head 35 is substantially wedge-shaped, and includes a bottom wall 351 substantially parallel to the support base 31, two triangle-shape sidewalls 353 perpendicular to the bottom wall 351, and a connecting wall 355 formed between the two sidewalls 353. The connecting wall 355 is configured to connect the connecting head 35 to the support base 31. The connecting wall 335 has a length greater than a width of the supporting base 31 of the sliding member 30. Top edges of the sidewalls 353 and the connecting wall 355, and a side edge of the bottom wall 351 cooperatively define a plane oblique to the supporting base 31. A plurality of securing hooks 37 extends from the top edge of the connecting wall 355 and the side edge of the bottom wall 351. The securing hooks 37 are configured to engage with the LCD monitor 100.

Figure 4:
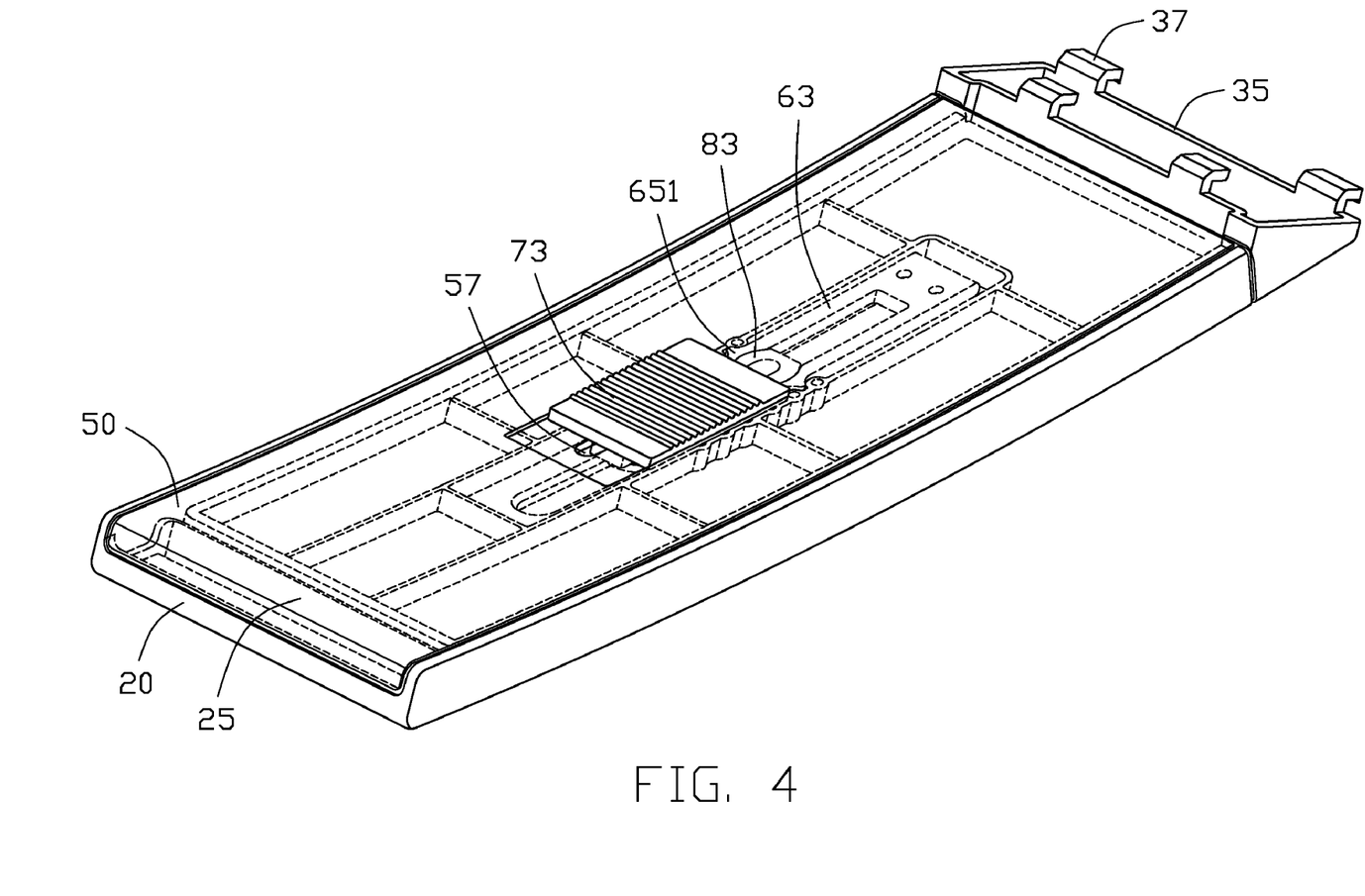
FIG. 4 is an assembled view of FIG. 1, showing the sliding member locked and the cover s in broken line.
Figure 5:
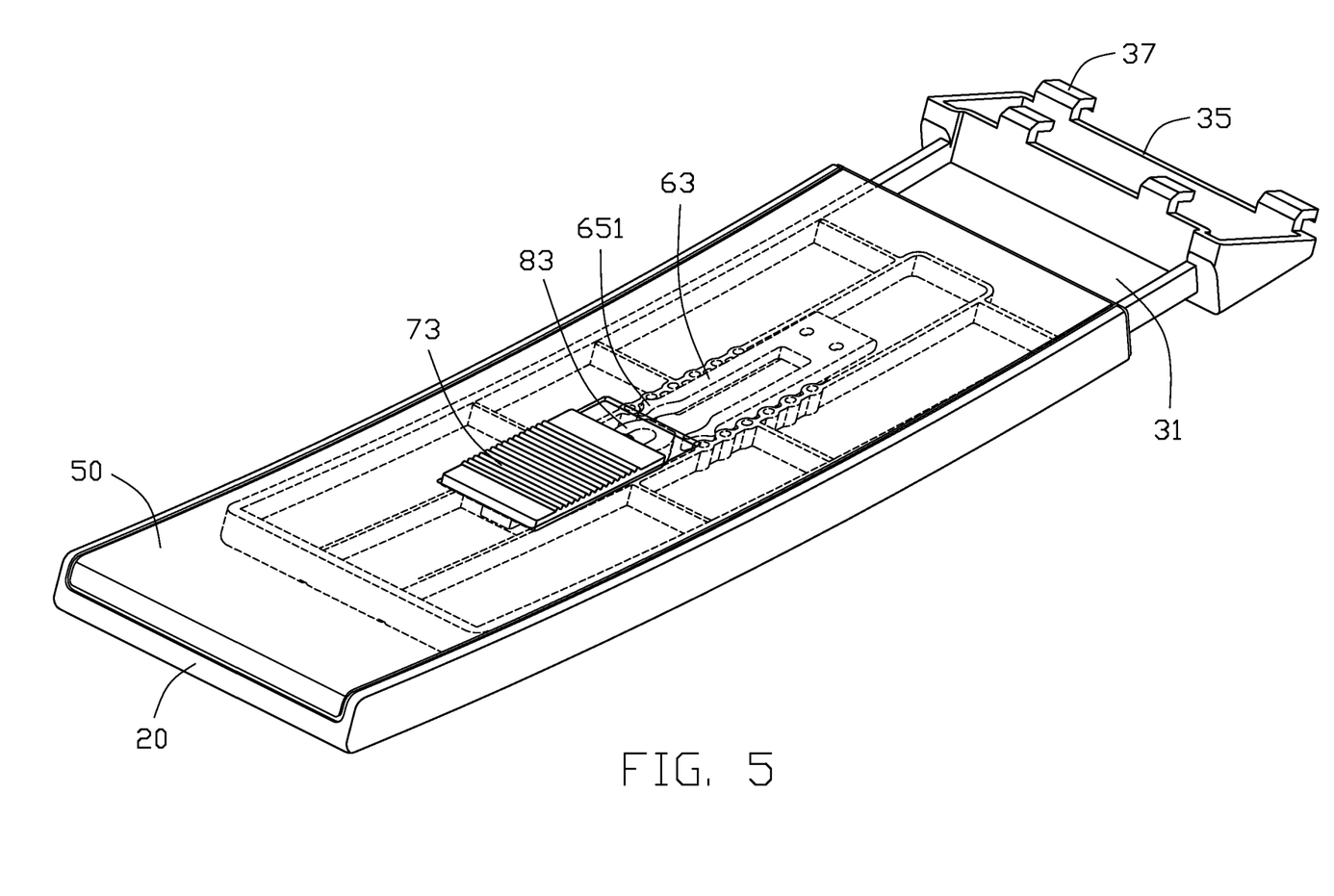
FIG. 5 is similar to FIG. 4, but showing the sliding member unlocked.

Referring to FIGS. 4-5, in assembly of the support apparatus 10, the supporting base 31 of the sliding member 30 is received in the receiving bracket 20. The cover 50 is disposed on the receiving bracket 20. The securing hooks 53 of the cover 50 extend into the receiving bracket 20 and engage in the securing slots 231, to keep the sliding member between the cover 50 and the receiving bracket 20. The positioning portions 651 of the elastic positioning member 60 engage in two corresponding positioning grooves 332 in the sliding member 30. The securing member 80 is in an unlocked position relative to the positioning member 60.

Referring to FIGS. 6-7, the oblique plane defined by the connecting head 35 abuts against a backplane 101 of the LCD monitor 100. The securing hooks 37 of the connecting head 35 are coupled to the backplane 101 to secure the support apparatus 10 to the LCD monitor 100. In a first position as shown in FIG. 4, the supporting base 31 of the sliding member 30 is entirely received in the receiving bracket 20 and the cover 50. The receiving bracket 20 and the cover 50 abut the connecting wall 355 of the connecting head 35. The sidewalls 23 of the receiving bracket 20 are respectively aligned with the sidewalls 353 of the connecting head 35 (shown in FIG. 4). Then, the actuating member 70 is pushed to drive the securing member 80 to slide along the slot 57 in the cover 50. The blocking portion 83 of the securing member 80 enters into the accommodating space 66 of the elastic positioning member 60, and biases the positioning portions 651 of the positioning hooks 65 to engage in two corresponding grooves 332 to lock the positioning member 60 in the grooves 332. Thus, the support apparatus 10 is fixed at the first position. The support apparatus 10 is arranged at a fixed angle relative to the LCD monitor 100.

In use, the LCD monitor 100 and the support apparatus 10 abut on the worktable 110. When adjusting a length of the support apparatus 10, the actuating member 70 is pushed to drive the securing member 80 to slide along the slot 57 in the cover 50. The blocking portion 83 of the securing member 80 disengages from the accommodating space 66 of the elastic positioning member 60. Then, the receiving bracket 20 and the cover 50 are pulled. The sliding member 30 slides relative to the receiving bracket 20 and the cover 50. The positioning hooks 65 of the elastic positioning member 60 on the cover 50 slide along the grooves 332 in the sliding member 30. When the support apparatus 10 achieves a desired length, the actuating member 70 is pushed to drive the securing member 80 to slide along the slot 57 in the cover 50. The blocking portion 83 of the securing member 80 enters into the accommodating space 66 of the elastic positioning member 60, and biases the positioning portions 651 of the positioning hooks 65 to engage in two corresponding grooves 332 to lock the positioning member 60 in the grooves 332. Thus, the support apparatus 10 is fixed at a desired length. The LCD monitor 100 can be arranged at different angles relative to the worktable 110 due to length change of the support apparatus 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An adjustable support apparatus for an LCD monitor, comprising:
a cover comprising a base plate, and a securing post, a first limiting portion extending from the base plate, and a second limiting portion extending from the base plate;
a sliding member secured on the LCD monitor and slidably attached to the cover, the sliding member defining a plurality of positioning grooves;
an elastic positioning member secured to the cover and comprising a base and two resilient arms extending from an end of the base; and
a securing member attached to the cover, the securing member biasing the two resilient arms to engage in two of the positioning grooves, wherein the base defines a securing hole; the securing post engages in the securing hole; a limiting slot is defined between the two resilient arms; the base is located between the first limiting portion and the second limiting portion, and the second limiting portion is received in the limiting slot, to restrict the elastic positioning member from moving along a direction substantially parallel to the base plate.

2. The adjustable support apparatus for an LCD monitor of claim 1, wherein the sliding member defines two rows of positioning grooves; two positioning hooks respectively extend from ends of the two elastic arms; the two positioning hooks are configured for engaging in two corresponding positioning grooves.

3. The adjustable support apparatus for an LCD monitor of claim 2, wherein an accommodating space is defined between the two positioning hooks, the securing member comprises a blocking portion that fits into the accommodating space to bias the positioning hooks to engage in corresponding positioning grooves.

4. The adjustable support apparatus for an LCD monitor of claim 3, wherein the cover defines a slot, an actuating member is secured to the securing member via the slot so as to drive the securing member sliding along the cover.

5. The adjustable support apparatus for an LCD monitor of claim 1, further comprising a receiving bracket secured to the cover, the sliding member is accommodated between the cover and the receiving bracket.

6. The adjustable support apparatus for an LCD monitor of claim 5, wherein the sliding member comprises a supporting base accommodated between the receiving bracket and the cover, and a connecting head extending from an end of the supporting base, the connecting head is exposed outside of the receiving bracket and the cover, and configured to be secured to the LCD.

7. The adjustable support apparatus for an LCD monitor of claim 6, wherein the connecting head defines a plane that is oblique to the supporting base, the plane is configured to abut against the LCD monitor, a plurality of securing hooks extend from the plane, configured to engage with the LCD monitor.

8. The adjustable support apparatus for an LCD monitor of claim 6, wherein the receiving bracket comprises two sidewalls perpendicular to the supporting base, a plurality of securing slots is defined in the two sidewalls, a plurality of hooks protruding from the cover is inserted in the receiving bracket to engage in the securing slots.

9. The adjustable support apparatus for an LCD monitor of claim 5, wherein two sliding ridges protrude from one of the receiving bracket and the sliding member in a longitudinal direction, two guiding slots are defined in the other of the receiving bracket and the sliding member, configured for the sliding ridges sliding therealong.

10. An adjustable support apparatus for an LCD monitor, comprising:
a cover;
a securing member attached to the cover and comprising an expanded blocking portion having an arc-shaped profile;
a sliding member secured to the LCD monitor and slidably attached to the cover, the sliding member defining a plurality of grooves; and
an elastic positioning member secured to the cover and comprising two arc-shaped positioning hooks, the elastic positioning member capable of sliding along the grooves to adjust a length of the adjustable support apparatus and to fix the adjustable support apparatus, and the expanded blocking portion interlocked between the two arc-shaped positioning hooks to adjust a length of the adjustable support apparatus and to fix the adjustable support apparatus at a certain length.

11. The adjustable support apparatus for an LCD monitor of claim 10, wherein the sliding member defines two rows positioning grooves, the positioning member comprises two elastic arms, each of the two arc-shaped positioning hooks extend from an end of each of the two elastic arms, the two arc-shaped positioning hooks are configured for engaging in two corresponding positioning grooves.

12. The adjustable support apparatus for an LCD monitor of claim 11, wherein an accommodating space is defined between the two positioning hooks, the expanded blocking portion fits into the accommodating space to bias the two arc-shaped positioning hooks to engage into corresponding positioning grooves.

13. The adjustable support apparatus for an LCD monitor of claim 12, wherein the cover defines a slot, an actuating member is secured to the securing member via the slot, so as to drive the securing member sliding along the cover in the slot length range.

14. The adjustable support apparatus for an LCD monitor of claim 13, wherein a cutout is defined in the cover to accommodate the actuating member, the cutout communicates with the slot.

15. The adjustable support apparatus for an LCD monitor of claim 10, wherein the sliding member comprises a supporting base accommodated between the receiving bracket and the cover, and a connecting head extending from an end of the supporting base, the connecting head is exposed outside of the cover, and configured to be secured to the LCD monitor.

16. The adjustable support apparatus for an LCD monitor of claim 15, wherein the connecting head defines a plane that is oblique to the supporting base, the plane is configured to abut against the LCD monitor; a plurality of securing hooks extend from the plane, configured to engage with the LCD monitor.

17. The adjustable support apparatus for an LCD monitor of claim 1, wherein the first limiting portion comprises a first limiting piece and two first resisting pieces; the second limiting portion comprises a second limiting piece and two second resisting pieces; the two first resisting pieces extend from two opposite sides of the first limiting piece; the first limiting piece is opposite to the second limiting piece; the two first resisting pieces are opposite to each other; and the base is located between the two first resisting pieces and the first limiting piece and the second limiting piece.

18. The adjustable support apparatus for an LCD monitor of claim 17, wherein the securing post is located between the first limiting piece and the second limiting piece.

19. The adjustable support apparatus for an LCD monitor of claim 11, wherein the cover comprises a base plate, a first limiting portion extending from the base plate, and a second limiting portion extending from the base plate; the elastic positioning member is secured to the base plate and further comprises a base, the two elastic arms extend from an end of the base, and a limiting slot is defined between the two elastic arms; the second limiting portion is received in the limiting slot; the first limiting portion comprises a first limiting piece and two first resisting pieces; the second limiting portion comprising a second limiting piece and two second resisting pieces; the two first resisting pieces extend from two opposite sides of the first limiting piece; the first limiting piece is opposite to the second limiting piece; the two first resisting pieces are opposite to each other; and the base is located between the two first resisting pieces and between the first limiting piece and the second limiting piece, to restrict the elastic positioning member from moving substantially parallel to the base plate.

20. The adjustable support apparatus for an LCD monitor of claim 15, wherein the receiving bracket comprising a rectangular panel and a sliding ridge protruding from the rectangular panel, a guiding slot is defined in a bottom surface of the supporting base, and the sliding ridge is located in the guiding slot and slidable along the guiding slot.

* * * * *